US007876851B2

(12) United States Patent
Lee et al.

(10) Patent No.: US 7,876,851 B2
(45) Date of Patent: Jan. 25, 2011

(54) APPARATUS AND METHOD FOR FEEDING BACK INFORMATION ON CHANNEL STATE FOR SCHEDULING IN MULTIPLE ANTENNA SYSTEM

(75) Inventors: Hak-Ju Lee, Incheon (KR); Sung-Kwon Hong, Seoul (KR); Dong-Seek Park, Yongin-si (KR); Daesik Hong, Seoul (KR); Sungtae Kim, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 994 days.

(21) Appl. No.: 11/714,701

(22) Filed: Mar. 6, 2007

(65) Prior Publication Data
US 2007/0223619 A1  Sep. 27, 2007

(30) Foreign Application Priority Data
Mar. 6, 2006 (KR) .................. 10-2006-0020824

(51) Int. Cl.
*H04B 7/02* (2006.01)
*H04L 1/02* (2006.01)

(52) U.S. Cl. .................. 375/267; 375/260; 455/132; 455/134; 455/135; 455/139; 455/504; 455/505; 455/506; 455/59; 455/60; 370/464; 370/465; 370/478; 370/480

(58) Field of Classification Search .................. 375/375, 375/267, 260, 340
See application file for complete search history.

(56) References Cited

U.S. PATENT DOCUMENTS

| 7,450,532 | B2 | 11/2008 | Chae et al. | |
| 7,773,685 | B2 * | 8/2010 | Tirkkonen et al. | 375/267 |
| 2005/0201307 | A1 | 9/2005 | Chae et al. | |
| 2006/0182192 | A1 * | 8/2006 | Takano | 375/267 |
| 2006/0209975 | A1 * | 9/2006 | Jeong et al. | 375/260 |
| 2008/0108310 | A1 * | 5/2008 | Tong et al. | 455/69 |
| 2010/0008411 | A1 * | 1/2010 | Hansen et al. | 375/224 |
| 2010/0054355 | A1 * | 3/2010 | Kinjo et al. | 375/262 |
| 2010/0195752 | A1 * | 8/2010 | Lee et al. | 375/267 |

FOREIGN PATENT DOCUMENTS

KR   1020050055592   6/2005

\* cited by examiner

*Primary Examiner*—Shuwang Liu
*Assistant Examiner*—Gina McKie
(74) *Attorney, Agent, or Firm*—The Farrell Law Firm, LLP

(57) ABSTRACT

An apparatus and method for controlling amount of information to be fed back in a multiple antenna system in a multi-user environment. The apparatus includes a channel estimator which estimates channel values by using an input signal; a Singular Value Decomposition (SVD) operator which decomposes singular values from the estimated channel values; and a feedback determining unit which uses the singular values to compute channel capacity that can be obtained according to the amount of channel information to be fed back, and selects the channel information to be fed back by using the channel capacity.

17 Claims, 6 Drawing Sheets

APPARATUS AND METHOD FOR FEEDING BACK INFORMATION ON CHANNEL STATE FOR SCHEDULING IN MULTIPLE ANTENNA SYSTEM

PRIORITY

This application claims priority under 35 U.S.C. §119 to an application filed in the Korean Intellectual Property Office on Mar. 6, 2006 and assigned Serial No. 2006-20824, the contents of which are incorporated herein by reference.

BACKGROUND OF THE INVENTION

1. Field of the Invention

The present invention relates to a multiple antenna system, and more particular, to an apparatus and method for determining whether to feedback each channel information of mobile station in a multiple antenna system in a multi-user environment.

2. Description of the Related Art

Recently, with the rapid growth of a wireless telecommunication market, there is a demand for a variety of multimedia services in a wireless environment. To meet this demand, transmission data becomes large in size, and data transmission speed increases. Research on a multiple antenna system (e.g., Multiple Input Multiple Output (MIMO)) has been conducted so a limited radio resource can be effectively used in a wireless telecommunication system.

In a multiple antenna system, by utilizing mutually independent channels for respective antennas, data transmission speed can be maximized, and channel fading can be avoided. Compared with a system using a single antenna, a multiple antenna system can increase channel transmission capacity in proportion to the number of antennas without having to additionally allocate a frequency or transmission power. As a result, research thereon has been actively conducted recently.

Furthermore, in a multiple antenna system, system reliability of the multiple antenna system can be improved according to a diversity gain, and a transmission rate can be improved according to a multiplexing gain. A multiple antenna system may operate in a multi-user environment in order to support multi-users.

In a multiple antenna system operating in a multi-user environment, a channel state of each mobile station (or user) is checked for, and data transmission is granted to a mobile station having the highest channel gain. In this manner, a multi-user diversity gain can be obtained. That is, multi-user diversity gain can be obtained by performing a scheduling process whereby data transmission is granted in consideration of the multi-user channel gain. The multi-user diversity gain has a diversity order higher than a diversity gain of an antenna which is taken into account in a multiple antenna system in a single user environment. Thus, it is possible to increase a transmission rate of the multiple antenna system.

Examples of a scheduling method of a multiple antenna system in a multi-user environment include a Best User selection (BU) scheduling method, a Best Substream selection (BS) scheduling method, a Proportional Fair (PF) scheduling method, and an eigen-based scheduling method. In a BU scheduling method, all streams are allocated to one mobile station of which a channel has the highest average channel gain of transmission antennas. In a BS scheduling method, a mobile station of which a channel has the highest channel gain is selected for each antenna to allocate a stream. In a PF scheduling method, an antenna is fairly allocated to each mobile station. In an eigen-based scheduling method, a singular vector corresponding to an antenna which has the highest channel gain and is used by each mobile station is fed back so a mobile station having the lowest correlation is selected.

The aforementioned scheduling methods are used to select a mobile station in a multiple antenna system in a multi-user environment, but there is a problem in that performance is degraded in a correlation channel environment. That is, correlation exists among antennas in a practical environment where a multiple antenna system is used. Therefore, a rank of the multiple antenna system decreases in a parallel channel environment. As a result, diversity gain that can be obtained by using the scheduling methods also decreases in a multiple antenna system. In an eigen-value based scheduling method, scheduling is performed by selecting a mobile station having the lowest correlation in order to avoid performance degradation caused by the correlation between antennas. However, the diversity gain cannot be fully achieved in a multi-user environment.

Meanwhile, a receiving end of the multiple antenna system feeds back channel information to a transmitting end so that scheduling can be performed at the transmitting end. However, this feedback process may cause a waste of resource in a multiple antenna system. Furthermore, channel information is fed back as many times as an increased number of transmission antennas or reception antennas in a multiple antenna system. For this reason, the receiving end of a multiple antenna system feeds back only a part of channel information to the transmitting end. Scheduling cannot be accurately performed in the transmitting end of a multiple antenna system, resulting in performance degradation. Accordingly, there is a need for a method in which a high transmission rate can be achieved in a multiple antenna system by feeding back only a necessary part of the channel information.

SUMMARY OF THE INVENTION

The present invention provides an apparatus and method for opportunistically feeding back channel information in a multiple antenna system in a multi-user environment.

The present invention also provides an apparatus and method for feeding back channel information by selecting channel information according to channel capacity of each mobile station in a multiple antenna system in a multi-user environment.

According to one aspect of the present invention, there is provided an apparatus for controlling an amount of channel information to be feed back in a multiple antenna system in a multi-user environment, the apparatus including a channel estimator which estimates channel values by using an input signal; a Singular Value Decomposition (SVD) operator which decomposes singular values from the estimated channel values; and a feedback determining unit which uses the singular values to compute channel capacity that can be obtained according to the amount of channel information to be feed back, and selects the channel information to be fed back by using the channel capacity.

According to another aspect of the present invention, there is provided a method of controlling amount of channel information to be feed back in a multiple antenna system in a multi-user environment, the method including decomposing singular values from channel values estimated using an input signal through SVD; computing channel capacity that can be obtained according to the amount of channel information to be fed back by using the singular values; selecting channel information to be fed back by using the channel capacity.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. Well-known functions or constructions are not described in detail since they would obscure the invention in unnecessary detail.

A technique for opportunistically feeding back channel information according to channel capacity in a multiple antenna system in a multi-user environment will now be described. Channel capacity is defined in the present invention as a maximum amount of data that can be transmitted according to channel information opportunistically fed back.

The following descriptions are examples of where an eigen-based scheduling method is used in the multiple antenna system. However, the present invention is not limited to the eigen-based scheduling method, and thus other methods may also be used such as a Best User selection (BU) scheduling method, a Best Substream selection (BS) scheduling method, and a Proportional Fair (PF) scheduling method.

Figure 1:
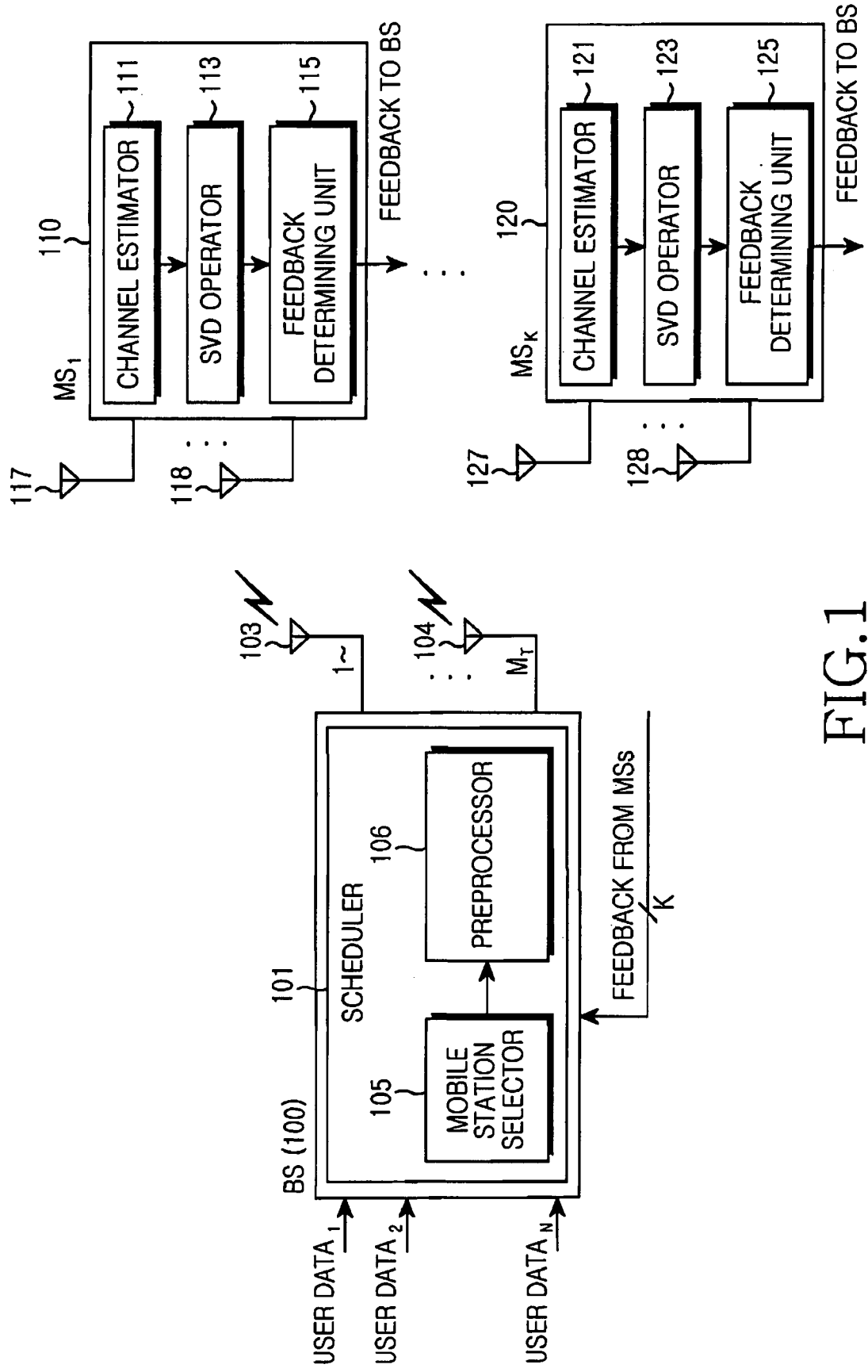
FIG. 1 is a block diagram of a multiple antenna system according to the present invention.

FIG. 1 shows a multiple antenna system according to the present invention. A Base Station (BS) 100 transmits a downlink signal to a total of K Mobile Stations (MSs) or users 110 to 120 by using a total of $M_T$ transmission antennas 103 to 104.

On the receiving of the downlinks signal from the BS 110, the MSs 110 to 120 estimate channel values by using the downlink signal. Thereafter, the MSs 110 to 120 opportunistically feed back channel information (e.g., singular vector) by using channel capacity computed according to the estimated channel values. For example, the MSs 110 to 120 may compute the channel capacity by decomposing a signal value according to the estimated channel values.

The BS 100 schedules the downlink signal by using the channel information (e.g., singular value) fed back from the MSs 110 to 120.

In order to opportunistically feeding back the channel information according to the channel capacity, the MSs 110 to 120 include channel estimators 111 and 121, Singular Value Decomposition (SVD) operators 113 and 123, and feedback determining units 115 and 125. The channel information to be fed back may differ for each mobile station.

The channel estimators 111 and 121 estimate channel information by using a pilot of the downlink signal received from the BS 100. To estimate the channel information, the channel estimators 111 and 121 may use a channel estimating method such as a least square method and a minimum mean square error method.

The SVC operators 113 and 123 decompose the estimated channel information into a signal vector ($L_k$, $R_k$) and a singular value ($\Lambda_k$) according to Equation (1).

$$H_k = L_k \cdot \Lambda_K \cdot R_k^H \tag{1}$$

$L_k$ denotes an estimated channel value of the k-th mobile station. $\Lambda_k$ denotes a diagonal matrix whose component corresponds to a singular value of the k-th mobile station. $L_k$ and $R_k$ denote matrixes whose columns are respectively a left singular vector of the k-th estimated channel value and a right singular vector thereof.

Thereafter, the SVD operators 113 and 123 compute values by squaring absolute values of singular values. Then, the obtained values are sequentially sorted. The feedback determining units 115 and 125 compare the obtained values with the singular values. It will be assumed that the SVD operators 113 and 123 sort the obtained values in a descending order.

The feedback determining units 115 and 125 compare the greatest singular value $\lambda_1$ among the sorted singular values with an average value $\lambda_{1,mean}$ of a specific time period and then determine whether to perform feedback.

When feedback is determined to be performed, the feedback determining units 115 and 125 determine channel information (e.g., singular vector) to be fed back by using channel capacity according to Equation (2).

$$C_M = \prod_{i=1}^{M} \left(1 + \left(\frac{E_s}{N_O}\right) \cdot \frac{|\lambda_i|^2}{M}\right) \tag{2}$$

$C_M$ denotes channel capacity when a total of M channels are all used, and M denotes an order that depends on transmission antennas of a base station. To prevent the increase of interference among mobile stations, M is half the number of transmission antennas, that is, $M_T$. $E_s/N_o$ denotes a Signal to Noise Ratio (SNR) of an input signal, and $|\lambda_i|^2$ denotes a square of an absolute value of an i-th singular value.

For example, the feedback determining units 115 and 125 determine whether the channel information will be fed back according to Equation (3).

$$\frac{|\lambda_1|^2}{|\lambda_1|^2_{mean}} > \tag{3}$$

$|\lambda_1|^2$ denotes a square of an absolute value of a first singular value, and $|\lambda_1|^2_{mean}$ denotes an average obtained by squaring an absolute value of a singular value of a specific time period, where $|\lambda_1|^2$ denotes the greatest singular value.

Equation (3) is satisfied if $|\lambda_1|^2$ is greater than $|\lambda_1|^2_{mean}$ and is not satisfied if $|\lambda_1|^2$ is equal to or less than $|\lambda_1|^2_{mean}$. If Equation (3) is satisfied, the feedback determining units 115 and 125 determine that a channel state is good and thus performs feedback. Otherwise, the feedback determining units 115 and 125 determine that the channel state is bad and thus do not perform the feedback. In other words, when $|\lambda_1|^2$ is greater than $|\lambda_1|^2_{mean}$, the feedback determining units 115 and 125 select channel information to be fed back according to Equation (2). When $|\lambda_1|^2$ is equal to or less than $|\lambda_1|^2_{mean}$, the feedback determining units 115 and 125 determine that the channel state is bad and thus do not perform the feedback.

The base station 100 includes a scheduler 101 to schedule the downlink signal by using feedback information that is fed back from the mobile stations 110 to 120.

The scheduler 101 includes a mobile station selector 105 and a preprocessor 107.

In order to maximize channel capacity, the mobile station selector 105 uses the received feedback information to select a total of M mobile stations having the best orthogonality among a total of M mobile stations, thereby outputting indices of the selected mobile stations.

The preprocessor 107 uses the indices of the selected mobile stations received from the mobile station selector 105 to configure an optimal preprocessing matrix. For example, the preprocessor 107 may use the feedback information of the selected mobile stations to configure each column of the preprocessing matrix.

Thereafter, the preprocessor 107 uses the configured preprocessing matrix to vectorize a transmission symbol (i.e., user data 1, user data 2, . . . , user data N) to be transmitted to each mobile station and then transmits the resultant values to the respective mobile stations 110 to 120.

Figure 2:
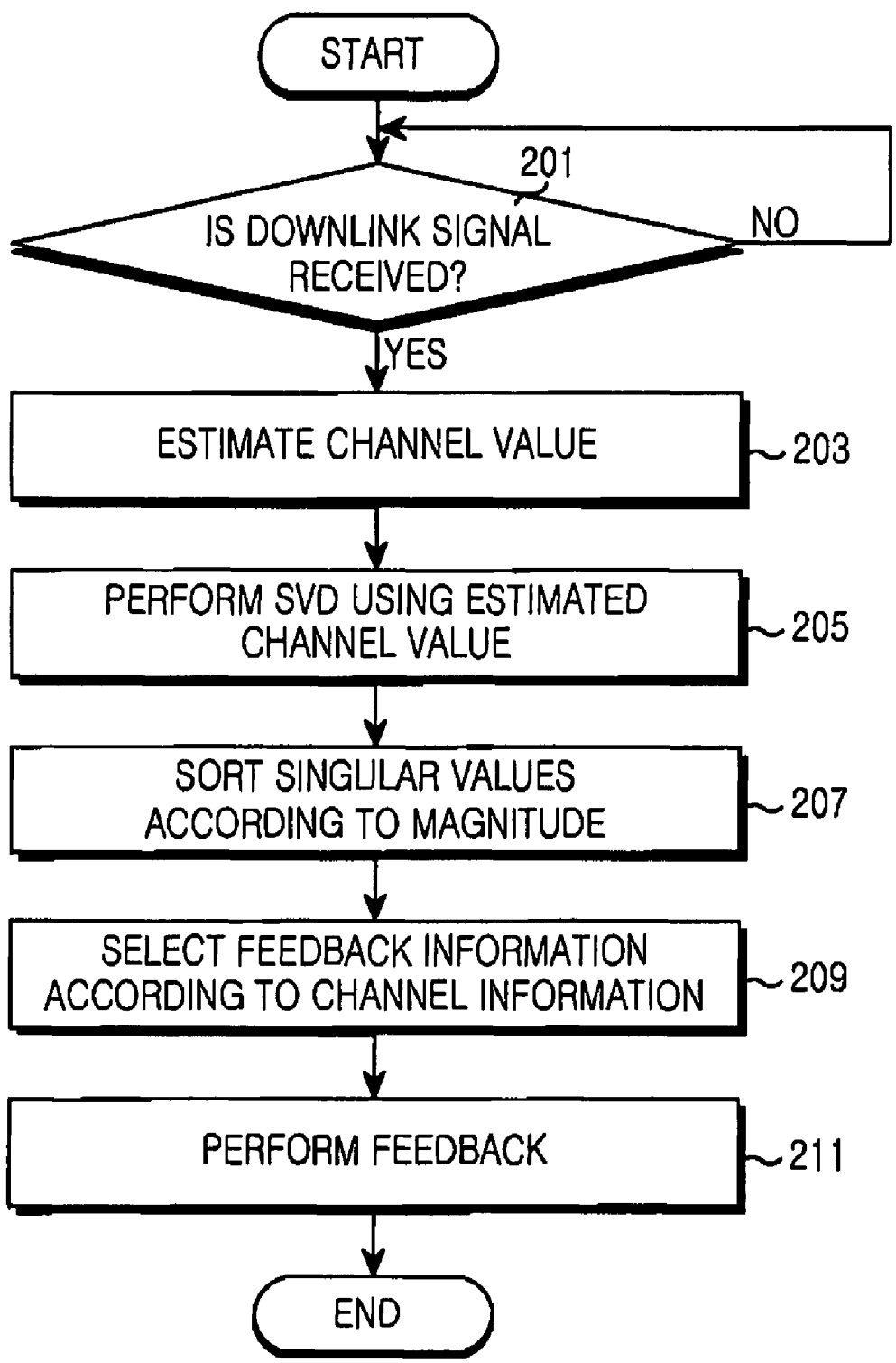
FIG. 2 is a flowchart of a procedure of an eigen-based scheduling method whereby feedback is performed by selecting channel information according to the present invention.

FIG. 2 shows a procedure of an eigen-based scheduling method whereby feedback is performed by selecting channel information according to the present invention. The first MS 110 will be discussed in the following descriptions. Referring to FIG. 2, whether a downlink signal is received from a base station is determined in step 201.

If the downlink signal is received, channel values are estimated by using a pilot signal included in the downlink signal in step 203, where a least square method or a minimum mean square error method may be used.

Next, the estimated channel values are decomposed into singular vectors and singular values through a SVD operation according to Equation (1) in step 205.

Next, the singular values are sequentially sorted according to magnitude in step 207. That is, values obtained by squaring absolute values of the singular values are computed and then are compared with magnitudes of the respective singular values. Thereafter, the singular values are sequentially sorted according to the magnitudes of the singular values. It will be assumed that the singular values are sorted in a descending order.

Figure 3:
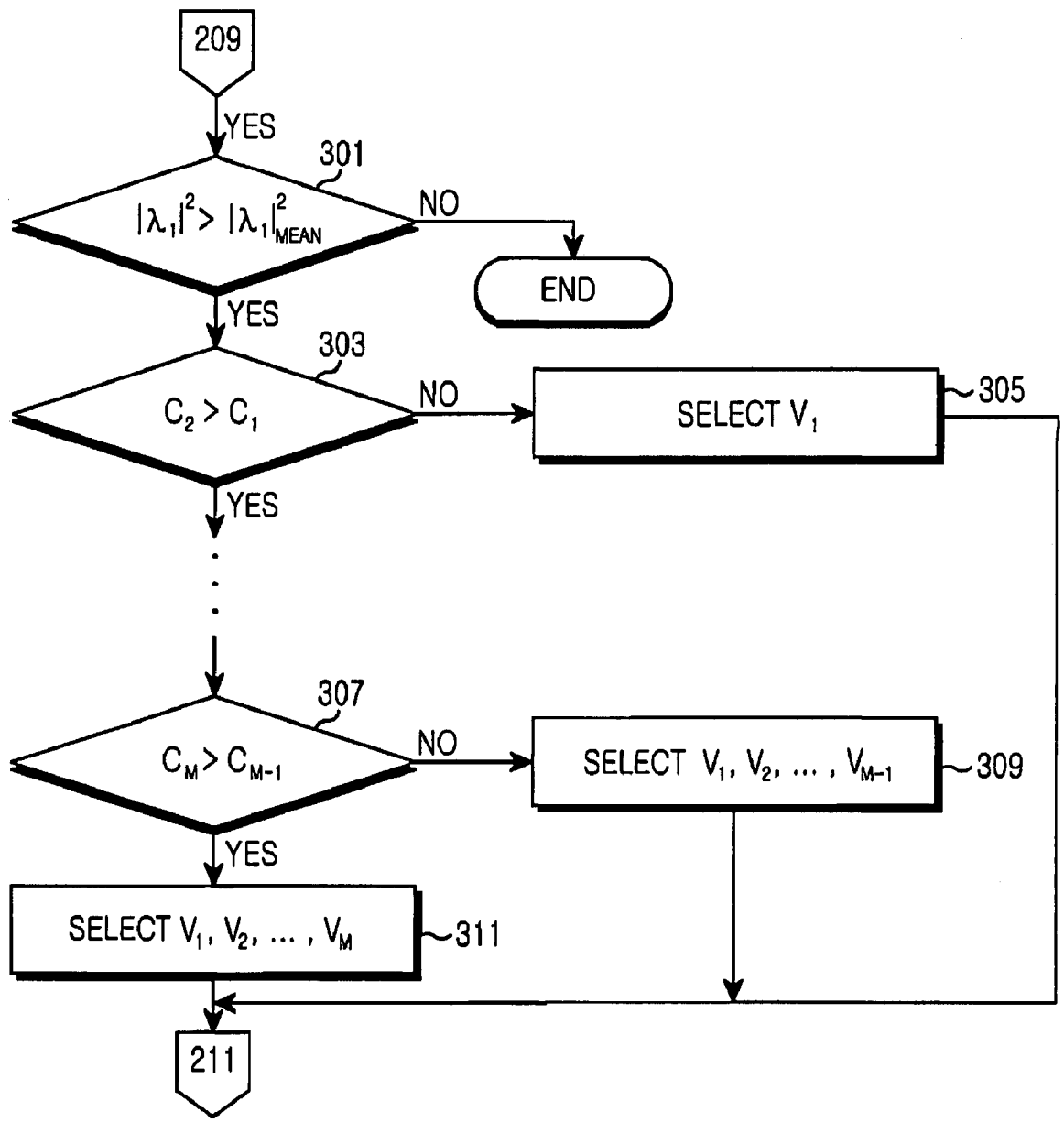
FIG. 3 is a flowchart of a procedure of an eigen-based scheduling method for selecting channel information to be fed back according to the present invention.

Next, in step 209, channel capacity depending on the singular values is computed, and then channel information for performing feedback is selected as shown in FIG. 3.

The selected channel information is then fed back to the base station in step 211.

The procedure is then terminated.

FIG. 3 shows a procedure of an eigen-based scheduling method for selecting channel information to be fed back according to the present invention. The following descriptions discuss a process in which the feedback determining unit 115 in the MS 110 determines information for performing feedback. Referring to FIG. 3, the greatest singular value is compared with an average of a singular value of a specific period of time so as to determine whether to perform feedback in step 301. Specifically, a value $|\lambda_1|^2$ obtained by squaring an absolute value of the greatest signaler value is compared with a value $|\lambda_1|^2_{mean}$ obtained by squaring an average of the singular value of the specific period of time according to Equation (3).

When the greatest signal value is equal to or less than the average of the signaler value ($|\lambda_1|^2 \leq |\lambda_1|^2_{mean}$), a channel state is determined to be bad, and thus the procedure is terminated without performing feedback.

On the other hand, when the greatest singular value is greater than the average of the singular value ($|\lambda_1|^2 > |\lambda_1|^2_{mean}$), a channel capacity $C_1$ used when one piece of channel information is fed back is compared with a channel capacity $C_2$ used when two pieces of channel information are fed back to select information for performing feedback in step 303. In step 303, the channel capacities are computed according to the magnitudes of the singular values in a descending order.

When $C_1$ is equal to or greater than $C_2$, only one piece of channel information is selected as channel information for performing feedback in step 305. The channel information denotes a right singular vector $V_1^H$ of the greatest singular value used to compute $C_1$.

On the other hand, when $C_1$ is less than $C_2$, a right singular vector $V_2^H$ of the second greatest singular value is selected along with the right singular vector $V_1^H$ of the greatest singular.

For example, the information for performing feedback may be selected according to Equation (4).

$$\begin{cases} \left(1+\left(\frac{E_s}{N_O}\right)|\lambda_1|^2\right) > \left(1+\left(\frac{E_s}{N_O}\right)\frac{|\lambda_1|^2}{2}\right) \\ \left(1+\left(\frac{E_s}{N_O}\right)\frac{|\lambda_2|^2}{2}\right): \text{feedback } V_1^H \\ \overline{\text{otherwise}: \text{feedback } V_1^H, V_2^H} \end{cases} \quad (4)$$

$$\left(1+\left(\frac{E_s}{N_O}\right)|\lambda_1|^2\right)$$

denotes the channel capacity $C_1$ used when one piece of channel information is fed back, and $$\left(1+\left(\frac{E_s}{N_O}\right)\frac{|\lambda_1|^2}{2}\right)\left(1+\left(\frac{E_s}{N_O}\right)\frac{|\lambda_2|^2}{2}\right)$$

denotes the channel capacity $C_2$ used when two pieces of channel information are fed back.

As shown in Equation (4), when $C_1$ is equal to or greater than $C_2$, only the singular vector for the first singular value is selected as information for performing feedback.

On the other hand, when $C_1$ is less than $C_2$, the singular vector for the first singular value and the singular vector for the second singular value are selected as information for performing feedback.

Likewise, channel capacities are sequentially compared with each other until the procedure reaches step 307 where M pieces of channel information have been subject to the comparison to be selected as information for performing feedback. In order to avoid the increase of interference among mobile stations, M is half of the number $M_T$ of the transmission antennas.

Figure 4A:
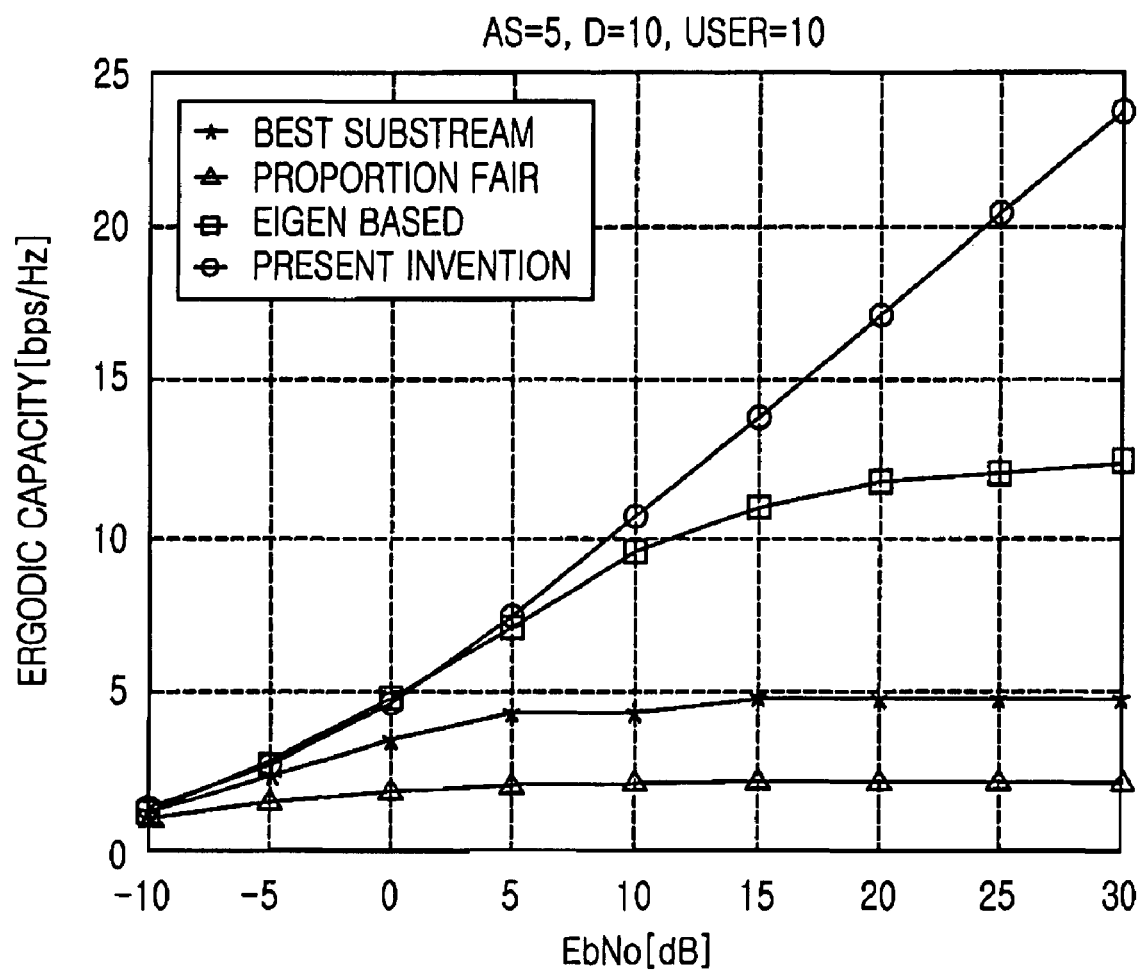
FIGS. 4A and 4B are graphs illustrating performance changes according to the present invention.
Figure 4B:
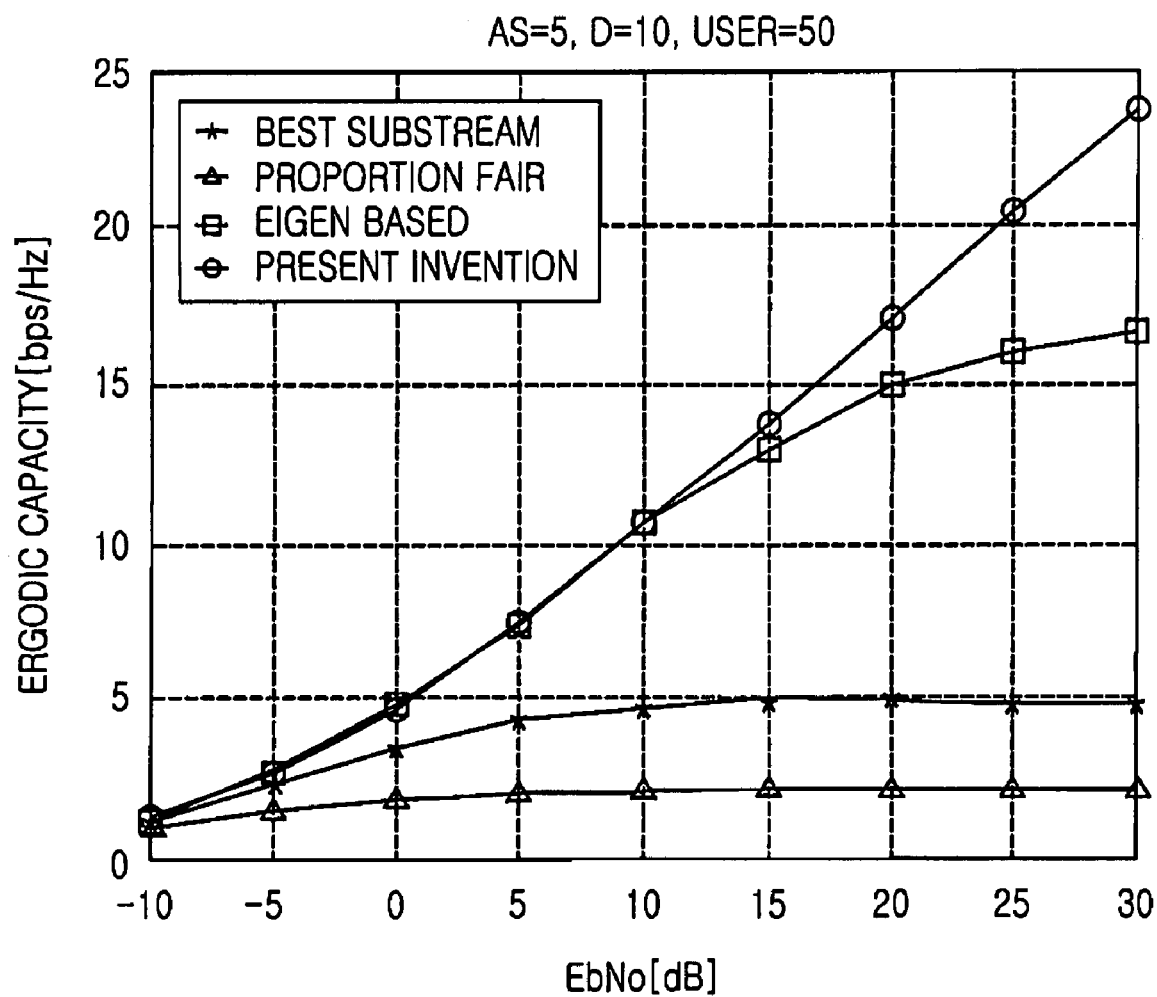

FIGS. 4A and 4B show performance changes according to the present invention. It will be assumed that a base station includes four transmission antennas, a mobile station includes four reception antennas, a Quadrature Phase Shift Keying (QPSK) modulation method is used, the antennas each have a distance of 10λ, and an angle spread (AS) is 5. Further, the horizontal axis represents an SNR, whereas the vertical axis represents channel capacity.

Referring to FIGS. 4A and 4B, the number of users is 10 in FIGS. 4A and 50 in FIG. 4B.

As shown in FIGS. 4A and 4B, channel capacity cannot increase above 5 bps/Hz when using the BS scheduling method or the PF scheduling method in which scheduling is performed by the use of a part of channel information. In addition, since the multi-user diversity cannot be obtained to the maximum even when using the eigen-based scheduling method, the channel capacity decreases starting from a point where SNR is above 10 dB. On the other hand, when using the scheduling method of the present invention in which channel information is opportunistically fed back according to a channel state, there is an advantage in that the channel capacity increases, that is, a data transmission rate increases.

Figure 5:
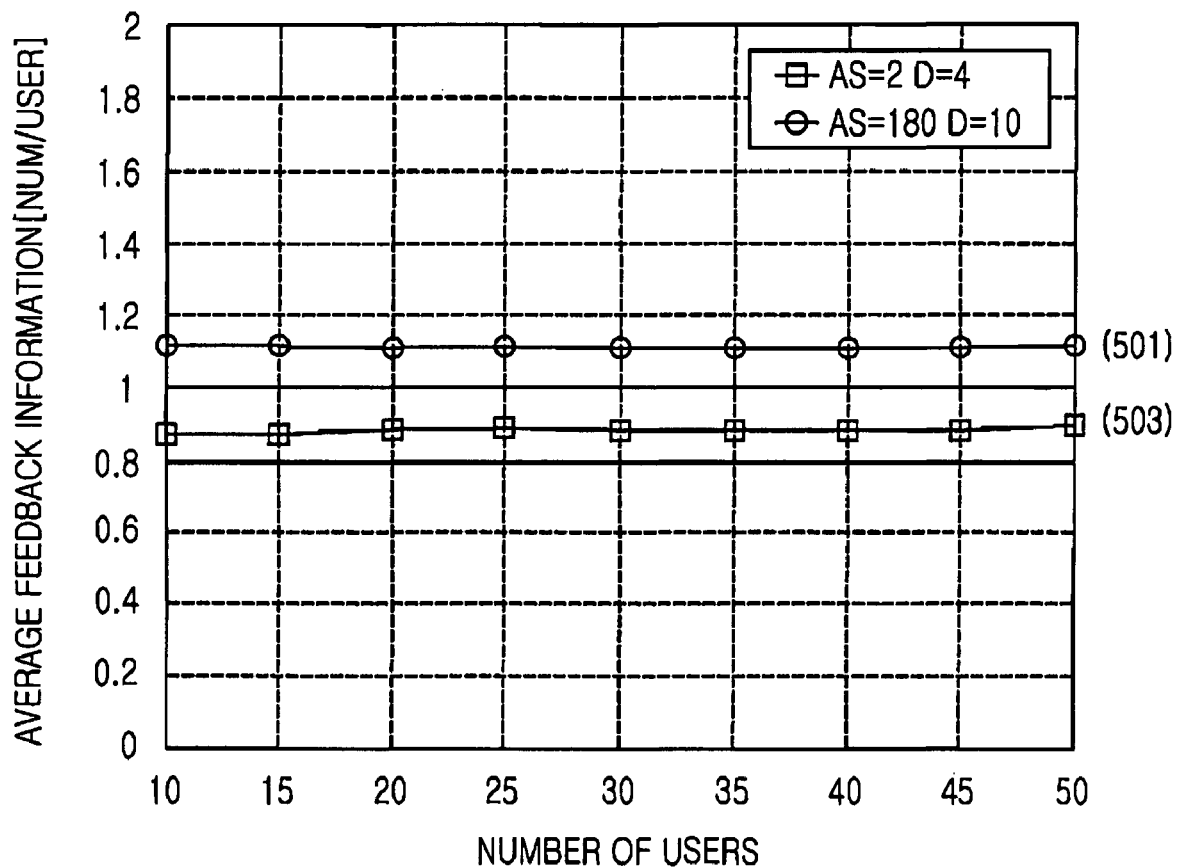
FIG. 5 is a graph illustrating performance changes according to the present invention.

FIG. 5 shows performance changes according to the present invention. It will be assumed that a base station includes four transmission antennas, a mobile station includes four reception antennas, and a QPSK modulation method is used. Further, the horizontal axis represents the number of users, whereas the vertical axis represents an average amount of feedback information.

Referring to FIG. 5, the amount of feedback information varies depending on the channel state of the multiple antenna system of the present invention. On average, however, the amount of feedback information approaches to 1. When a mobile station has a low channel correlation (indicated by 501 in FIG. 5), the amount of feedback information increases. On the other hand, when the mobile station has a high channel correlation (indicated by 503 in FIG. 5), the amount of feedback information decreases. Therefore, the amount of feedback information approaches 1 on average.

According to the present invention, channel information is opportunistically fed back according to a channel state in a multiple antenna system in a multi-user environment. Therefore, a high multi-user diversity gain can be obtained by performing partial feedback in a correlation channel environment, thereby increasing a transmission rate of the multiple antenna system.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for controlling an amount of channel information to be fed back in a multiple antenna system in a multi-user environment, the apparatus comprising:
    a channel estimator which estimates channel values by using an input signal;
    a Singular Value Decomposition (SVD) operator which decomposes singular values from the estimated channel values; and
    a feedback determining unit which uses the singular values to compute channel capacity that can be obtained according to the amount of channel information to be fed back, and selects the channel information to be fed back by using the channel capacity,
    wherein the feedback determining unit compares a greatest of the singular values with an average of the singular values of a specific period of time to determine whether to perform feedback, and
    wherein the feedback determining unit uses the singular values to compute the channel capacity that can be obtained according to the amount of channel information to be fed back, and selects the channel information to be fed back by using the channel capacity when feedback is determined to be performed.

2. The apparatus of claim 1, wherein the SVD operator decomposes the singular values from the estimated channel values and sequentially sorts the singular values.

3. The apparatus of claim 1, wherein the feedback determining unit determines to perform feedback when the greatest singular value is greater than the average of the singular values of the specific period of time, and determines not to perform feedback when the greatest singular value is equal to or less than the average of the singular values of the specific period of time.

4. The apparatus of claim 1, wherein the feedback determining unit compares a channel capacity $C_M$ that can be obtained by feeding back M pieces of channel information with a channel capacity $C_{M+1}$ that can be obtained by feeding back M+1 pieces of channel information, and then feeds back the M+1 pieces of channel information when $C_{M+1}$ is greater than $C_M$ when feedback is determined to be performed.

5. The apparatus of claim 4, wherein the feedback determining unit feeds back the M pieces of channel information if $C_{M+1}$ is equal to or less than $C_M$.

6. A method of controlling an amount of channel information to be fed back in a multiple antenna system in a multi-user environment, the method comprising steps of:
    decomposing singular values from channel values estimated using an input signal through Singular Value Decomposition (SVD);
    determining whether to perform feedback by comparing a greatest of the singular values with an average of the singular values of a specific period of time;
    computing channel capacity that can be obtained according to the amount of channel information to be fed back by using the singular values, when feedback is determined to be performed; and
    selecting channel information to be fed back by using the channel capacity.

7. The method of claim 6, wherein the determination step comprises:
    determining to perform feedback when the greatest singular value is greater than the average of the singular values of the specific period of time.

8. The method of claim 6, further comprising sequentially sorting the singular values, wherein the channel capacity is computed by using the sequentially sorted singular values.

9. The method of claim 6, wherein the step of selecting channel information comprises:
    comparing a channel capacity $C_M$ that can be obtained by feeding back M pieces of channel information with a channel capacity $C_{M+1}$ that can be obtained by feeding back M+1 pieces of channel information; and
    selecting the M+1 pieces of channel information as the channel information to be fed back if $C_{M+1}$ is greater than $C_M$.

10. The method of claim 9, further comprising selecting the M pieces of channel information as the channel information to be fed back when $C_{M+1}$ is equal to or less than $C_M$.

11. The method of claim 6, wherein the channel information to be fed back is a singular vector.

12. The method of claim 6, further comprising feeding back the selected channel information to a transmitting end.

13. An apparatus for controlling channel information to be fed back, the method comprising steps of:
   means for decomposing singular values from channel values estimated using an input signal through Singular Value Decomposition (SVD);
   means for computing channel capacity that can be obtained according to the amount of channel information to be fed back by using the singular values;
   means for selecting channel information to be fed back by using the channel capacity wherein the means for computing channel capacity performs the steps of:
   determining whether to perform feedback by comparing a greatest of the singular values with an average of the singular values of a specific period of time; and
   computing channel capacity that can be obtained according to the amount of channel information to be fad back when feedback is determined to be performed.

14. The apparatus of claim 13, wherein the step of determining comprises:
   determining to perform feedback when the greatest singular value is greater than the average of the singular values of the specific period of time.

15. The apparatus of claim 13, further comprising means for sequentially sorting the singular values, wherein the channel capacity is computed by using the sequentially sorted singular values.

16. The apparatus of claim 13, wherein the means for selecting channel information performs the steps of:
   comparing a channel capacity $C_M$ that can be obtained by feeding back M pieces of channel information with a channel capacity $C_{M+1}$ that can be obtained by feeding back M+1 pieces of channel information; and
   selecting the M+1 pieces of channel information as the channel information to be fed back if $C_{M+1}$ is greater than $C_M$.

17. The apparatus of claim 13, wherein the channel information to be fed back is a singular vector.

* * * * *